US010359954B2

United States Patent
Zhou et al.

(10) Patent No.: US 10,359,954 B2
(45) Date of Patent: Jul. 23, 2019

(54) METHOD AND SYSTEM FOR IMPLEMENTING BYTE-ALTERABLE WRITE CACHE

(71) Applicant: Alibaba Group Holding Limited, George Town, Grand Cayman (KY)

(72) Inventors: Ping Zhou, Folsom, CA (US); Shu Li, Bothell, CA (US)

(73) Assignee: Alibaba Group Holding Limited, George Town (KY)

( * ) Notice: Subject to any disclaimer, the term of this patent is extended or adjusted under 35 U.S.C. 154(b) by 43 days.

(21) Appl. No.: 15/610,079

(22) Filed: May 31, 2017

(65) Prior Publication Data

US 2018/0349041 A1  Dec. 6, 2018

(51) Int. Cl.
*G06F 13/00*     (2006.01)
*G06F 3/06*      (2006.01)
*G06F 12/0804*   (2016.01)
*G06F 12/0893*   (2016.01)

(52) U.S. Cl.
CPC .......... *G06F 3/0619* (2013.01); *G06F 3/064* (2013.01); *G06F 3/0656* (2013.01); *G06F 3/0659* (2013.01); *G06F 3/0685* (2013.01); *G06F 12/0804* (2013.01); *G06F 12/0893* (2013.01)

(58) Field of Classification Search
CPC ................................................ G06F 2212/217
See application file for complete search history.

(56) References Cited

U.S. PATENT DOCUMENTS

| 4,775,932 | A  | 10/1988 | Oxley |
| 6,226,650 | B1 | 5/2001  | Mahajan et al. |
| 7,565,454 | B2 | 7/2009  | Zuberi |
| 8,260,924 | B2 | 9/2012  | Koretz |
| 8,452,819 | B1 | 5/2013  | Sorenson, III |
| 8,516,284 | B2 | 8/2013  | Chan |
| 9,092,223 | B1 | 7/2015  | Pani |
| 2002/0010783 | A1 | 1/2002 | Primak |

(Continued)

FOREIGN PATENT DOCUMENTS

| JP | 2003022209 | 1/2003 |
| JP | 2011175422 | 9/2011 |
| WO | 1994018634 | 8/1994 |

OTHER PUBLICATIONS https://web.archive.org/web/20071130235034/http://en.wikipedia.org:80/wiki/logical_block_addressing wikipedia screen shot retriefed on wayback Nov. 20, 2007 showing both physical and logical addressing used historically to access data on storage devices (Year: 2007).

*Primary Examiner* — Sean D Rossiter (74) *Attorney, Agent, or Firm* — Shun Yao; Park, Vaughan, Fleming & Dowler LLP (57) ABSTRACT

One embodiment described herein provides a data storage system. The storage system includes a communication interface for receiving a write command from a host of the data storage system and a first write cache coupled to the host via the communication interface. The write command includes to-be-written data and address information associated with the to-be-written data. The first write cache is configured to temporarily store the to-be-written data before sending the to-be-written data to a high-capacity storage device coupled to the host, and the first write cache is configured to update its content by performing byte-level in-place writing based on the received write command.

18 Claims, 8 Drawing Sheets

(56) References Cited

U.S. PATENT DOCUMENTS

| | | | |
|---|---|---|---|
| 2002/0161890 A1 | 10/2002 | Chen | |
| 2004/0010545 A1 | 1/2004 | Pandya | |
| 2004/0255171 A1 | 12/2004 | Zimmer | |
| 2004/0268278 A1 | 12/2004 | Hoberman | |
| 2005/0038954 A1 | 2/2005 | Saliba | |
| 2005/0097126 A1 | 5/2005 | Cabrera | |
| 2005/0177755 A1 | 8/2005 | Fung | |
| 2005/0235171 A1 | 10/2005 | Igari | |
| 2006/0156012 A1 | 7/2006 | Beeson | |
| 2007/0033323 A1 | 2/2007 | Gorobets | |
| 2009/0282275 A1 | 11/2009 | Yermalayeu | |
| 2010/0229224 A1 | 9/2010 | Etchegoyen | |
| 2010/0325367 A1 | 12/2010 | Kornegay | |
| 2011/0055458 A1 | 3/2011 | Kuehne | |
| 2011/0153903 A1 | 6/2011 | Hinkle | |
| 2011/0231598 A1 | 9/2011 | Hatsuda | |
| 2011/0292538 A1 | 12/2011 | Haga | |
| 2011/0302353 A1 | 12/2011 | Confalonieri | |
| 2012/0117399 A1 | 5/2012 | Chan | |
| 2012/0246392 A1 | 9/2012 | Cheon | |
| 2013/0073798 A1 | 3/2013 | Kang | |
| 2013/0145085 A1* | 6/2013 | Yu | G06F 12/0246 711/103 |
| 2013/0145089 A1 | 6/2013 | Eleftheriou | |
| 2013/0159251 A1 | 6/2013 | Skrenta | |
| 2013/0166820 A1 | 6/2013 | Batwara | |
| 2013/0173845 A1* | 7/2013 | Aslam | G06F 12/0871 711/103 |
| 2013/0318283 A1 | 11/2013 | Small | |
| 2014/0233950 A1 | 8/2014 | Luo | |
| 2014/0250259 A1 | 9/2014 | Ke | |
| 2014/0310574 A1* | 10/2014 | Yu | G06F 11/1072 714/773 |
| 2014/0359229 A1 | 12/2014 | Cota-Robles | |
| 2014/0365707 A1 | 12/2014 | Talagala | |
| 2015/0082317 A1 | 3/2015 | You | |
| 2015/0106556 A1* | 4/2015 | Yu | G11C 16/349 711/103 |
| 2015/0142752 A1 | 5/2015 | Chennamsetty | |
| 2015/0372597 A1 | 12/2015 | Luo | |
| 2016/0098344 A1* | 4/2016 | Gorobets | G06F 3/0626 711/154 |
| 2016/0110254 A1 | 4/2016 | Cronie | |
| 2016/0232103 A1 | 8/2016 | Schmisseur | |
| 2016/0239074 A1 | 8/2016 | Lee | |
| 2016/0239380 A1 | 8/2016 | Wideman | |
| 2016/0343429 A1 | 11/2016 | Nieuwejaar | |
| 2016/0350002 A1 | 12/2016 | Vergis | |
| 2017/0168986 A1 | 6/2017 | Sajeepa | |
| 2017/0353576 A1 | 12/2017 | Guim Bernat | |
| 2018/0024772 A1 | 1/2018 | Madraswala | |
| 2018/0088867 A1 | 3/2018 | Kaminaga | |

* cited by examiner

METHOD AND SYSTEM FOR IMPLEMENTING BYTE-ALTERABLE WRITE CACHE

BACKGROUND

Field

This disclosure is generally related to data storage devices and systems. More specifically, this disclosure is related to a data storage system that implements a write cache that allows high-frequency write operations.

Related Art

Data storage devices play an important role in modern computing, especially in eras of cloud computing and big data. Many of the enterprise or high-performance computational workloads (e.g., key-value databases, data analytics, transactional databases) exhibit a high ratio of small random writes at runtime.

Because magnetic-based hard disk drives (HDD) are often too slow to handle high-frequency writes, current computer systems often implement a Not AND (NAND gate-based solid-state drive (SSD) as a write cache, which can collect write commands and cache them until the hard disk can be written to later. Alternatively, the HDD may be replaced by the faster NAND SSD. However, handling high-frequency small random writes can still be a challenge to NAND SSDs. First, NAND SSDs write at page level, and each page can be 16 KB or larger. Hence, changing a single byte in a page will require the entire page to be rewritten and, thus, can lead to high write amplification and significantly faster wearing of the drive. Moreover, NAND SSDs cannot be updated in-place; instead, pages must be erased before they can be written. The erase operations are typically performed at the block level, with a block being as large as several megabytes. Changing a single byte in a page can cause the whole page to be invalidated and redirected to a new page. Consequently, high-frequency small writes can cause an SSD to run out of clean page quickly, triggering expensive garbage-collection operations. This can lead to a severely degraded performance.

SUMMARY

One embodiment described herein provides a data storage system. The storage system includes a communication interface for receiving a write command from a host of the data storage system and a first write cache coupled to the host via the communication interface. The write command includes to-be-written data and address information associated with the to-be-written data. The first write cache is configured to temporarily store the to-be-written data before sending the to-be-written data to a high-capacity storage device coupled to the host, and the first write cache is configured to update its content by performing byte-level in-place writing based on the received write command.

In a variation on this embodiment, the high-capacity storage device comprises one or more of: a hard disk drive (HDD) and a solid-state drive (SSD).

In a variation on this embodiment, the first write cache comprises a storage class memory (SCM) device.

In a variation on this embodiment, the communication interface comprises a standard block-storage interface.

In a further variation, the standard block-storage interface comprises a Non-Volatile Memory express (NVMe) interface.

In a variation on this embodiment, the storage system further includes a second write cache coupled to the host. The second write cache is configured to receive data flushed from the first write cache and update its content at page level based on data received from the first write cache.

In a further variation, the second write cache comprises a solid-state drive (SSD).

In a further variation, the SSD includes a NAND flash memory.

In a variation on this embodiment, the first write cache includes a command-processing unit, which is configured to: process the write command to determine whether updating its content requires a partial-page update; in response to determining that a partial-page update is required, compute at least one page mask, wherein the page mask indicates portions of a page that need to be updated; and send the page mask to a media controller to facilitate content updating at the indicated portions of the page.

In a further variation, while processing the write command, the command-processing unit is further configured to simultaneously transfer the to-be-written data to a transfer buffer.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention solve the problem of improving efficiency and reducing hardware wear associated with high-frequency write operations by facilitating a novel byte-alterable write cache. More specifically, the byte-alterable write cache can be based on Storage Class Memory (SCM), which can provide much higher endurance, lower latency, better quality of service (QoS), and the ability of in-place writing. Partial-page update commands can be sent to the SCM device over a standard block-storage interface, thus eliminating the need of modifying conventional communication protocols between the host and the storage system.

Novel Storage System

Figure 1:
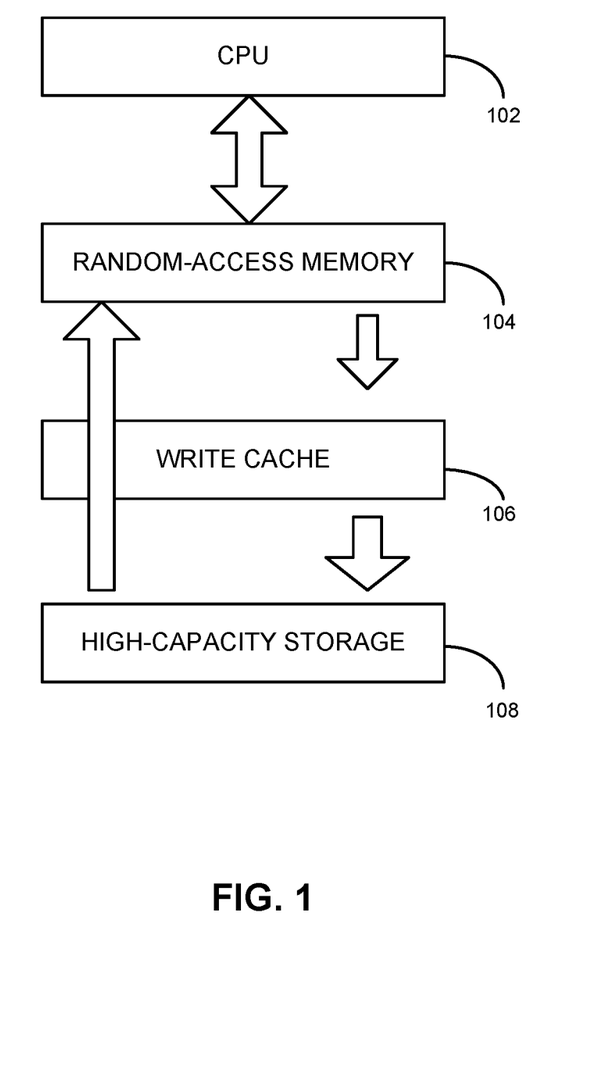
FIG. 1 illustrates a flow diagram of an exemplary dynamic-password authentication process in accordance with one embodiment described herein.

Because different types of storage media have different characteristics, computer systems often employs storage hierarchies, which place storage devices with lower latency and smaller capacity closer to the central processing unit (CPU) and storage devices with higher latency and larger capacity farther away. FIG. 1 presents a diagram illustrating an exemplary storage and data hierarchy of a computer system.

In FIG. 1, random-access memory (RAM) 104, which can sometimes be referred to as the primary storage or main/internal memory, can be directly accessible by CPU 102. In general, RAM 104 allows continuous read and write operations by CPU 102. Dynamic random-access memory (DRAM) can be used as the main memory of a computer due to its fast read/write speed. Large-capacity storage device 108 can be the secondary storage (also known as the external memory or auxiliary storage) that is not directly accessible by CPU 102. Large-capacity storage device 108 often can include a magnetic-based hard disk drive (HDD) that can provide large storage capacity at a lower price. However, compared with RAM devices, the time it requires to access a given byte of information stored on a hard disk can be many magnitudes longer. In addition to HDD, solid-state drives (SSD), such as flash memory devices, can also be used as secondary storage.

Although various algorithms can be used to increase the data-access efficiency of the HDD (e.g., by transferring data to and from disks in large contiguous blocks), handling high-frequency small writes (e.g., partial-page writes) can be very challenging for HDDs. One solution is to implement a write cache 106 between RAM 104 and high-capacity storage device 108 to allow small random writes to be consolidated before they are sent to high-capacity storage device 108. Write cache 106 can be implemented with SSD devices (e.g., a NAND SSD). However, although SSD devices can provide faster write speeds than HDDs, using SSD devices for write caching can still be problematic due to the characteristics of the SSD.

Because in SSD data can only be written in pages, the amount of data written into the SSD is usually much larger than the actual amount of new data. This phenomenon is known as write amplification. High-frequency small writes can cause very high write amplification (e.g., updating a single byte of data requires an entire page to be updated), thus having a negative impact on the life of the SSD. Moreover, due to the nature of the SSD's operation, data cannot be directly overwritten in an SSD device as it can in an HDD device. Instead, a small write (e.g., updating a portion of a page) can only be performed as a "read-modify-write" operation, where the affected page is first read, modified at desired byte locations, and then written at a new page location. The data in the old location is no longer valid and needs to be erased before the location can be written again. In SSD, the erase operations must be done in larger units called blocks. Each block is made up of multiple (e.g., 32 or 256) pages. High-frequency small writes can cause the SSD to run out of clean pages, triggering garbage collection, which can also contribute to write amplification and degradation of SSD performances.

It is also possible to implement the write cache 106 using DRAM. For example, a portion of RAM 104 can be used for write buffering to reduce the traffic of small writes that arrives at high-capacity storage 108. However, the volatile nature of DRAM increases the chances of data loss in case of power loss of system failure. In addition, the limited capacity of the DRAM also limits the effectiveness of the DRAM-based write cache.

In order to solve the aforementioned problems facing data storage systems when dealing with high-frequency random small writes, in some embodiments of the present invention, a novel byte-alterable write cache can be implemented before a conventional SSD-based write cache. More specifically, this novel byte-alterable write cache can include a storage class memory (SCM) device. SCM, also known as persistent memory, is a hybrid between a conventional storage device (which typically refers to the non-volatile devices not directly accessible by the CPU) and a memory (which typically refers to random-access memory). SCM devices can be orders of magnitude faster than conventional SSD devices and can be significantly more resilient. Although slower than DRAM, SCM devices are persistent, meaning that content stored on SCM devices is preserved during a power cycle. Hence, SCM-based write cache does not face the problem of possible data loss in case of power loss or system failure.

Figure 2A:
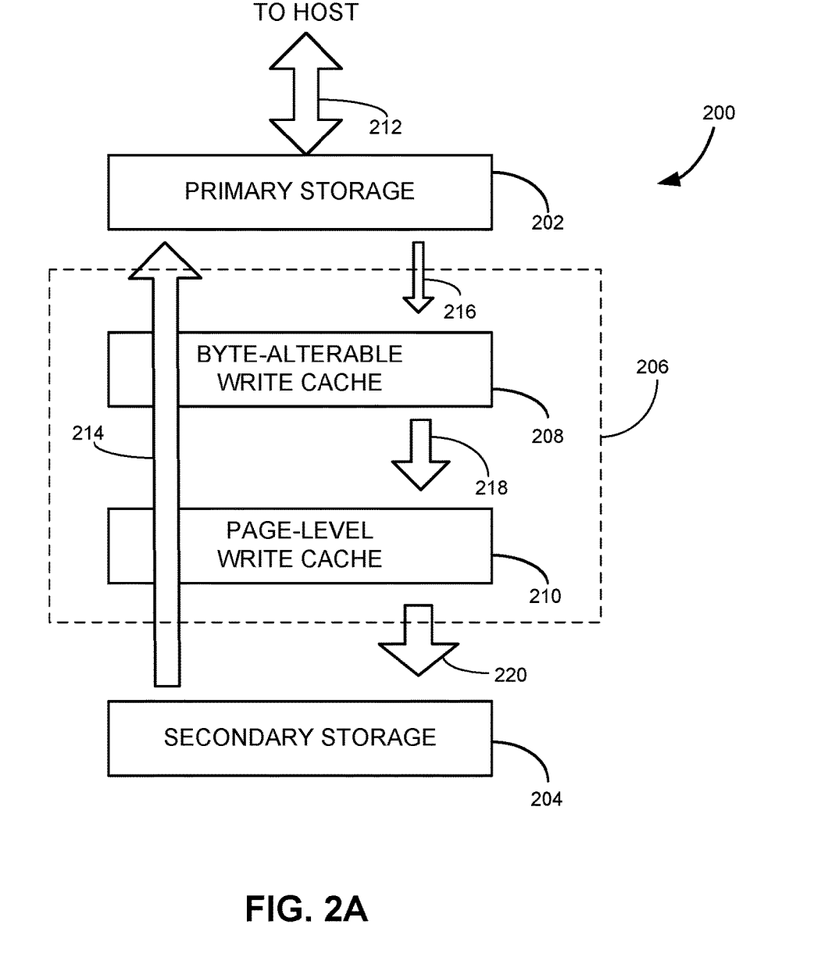
FIG. 2A presents a diagram illustrating an exemplary storage hierarchy of a computer system implementing a byte-alterable write cache, according to an embodiment of the present invention.

FIG. 2A presents a diagram illustrating an exemplary storage hierarchy of a computer system implementing a byte-alterable write cache, according to an embodiment of the present invention. In FIG. 2A, storage hierarchy 200 can include a primary storage layer 202, a secondary storage layer 204, and a write-cache layer 206. Primary storage layer 202 can be directly accessed by the host, including both read and write operations, as shown by double arrow 212. As discussed previously, primary storage layer 202 can include RAM devices, such as DRAMs. On the other hand, secondary storage layer 204 is not directly accessible by the host. Typically, the host access desired data stored in secondary storage layer 204 by first transferring the desired data from secondary storage layer 204 to primary storage layer 202. For example, a read operation can result in data being copied from secondary storage layer 204 to primary storage layer 202, as shown by arrow 214. However, to ensure efficiency and performance of the storage system, writes, especially random non-sequential writes that require partial-page updates, do not directly arrive at secondary storage layer 204; instead, they are first cached at write-cache layer 206.

In the example shown in FIG. 2A, write-cache layer 206 can also be hierarchical, including a byte-level (or byte-alterable) write cache 208 and a page-level (or page-alterable) write cache 210. Small random writes that require partial-page updates can be absorbed by byte-level write cache 208, as shown by arrow 216. Byte-level write cache 208 may consolidate many small random writes (using certain known caching algorithms) into page writes and send the consolidated page writes to page-level write cache 210, as shown by arrow 218. Similarly, page-level write cache 210 may consolidate many page writes (using certain known caching algorithms) into large-chunk, mostly sequential writes and send those writes to secondary storage 204, as shown by arrow 220. As one can see from FIG. 2A, high-frequency small random writes originating from the host can be consolidated into page writes and then into large-chunk sequential writes. This two-step conversion can reduce the amount of page updates performed by page-level write cache 210, thus prolonging the lifetime of page-level write cache 210 and at the same time increasing the efficiency of the storage system.

In some embodiments, write-cache layer 206 may be a single layer, including only the byte-level write cache, which consolidates small random writes into large-chunk writes and sends the large-chunk writes directly to secondary storage layer 204. In such a scenario, the byte-level write cache may need to have a relatively large capacity and implement a more complex caching algorithm in order to consolidate a larger number of small random writes into a large-chunk write.

Figure 2B:
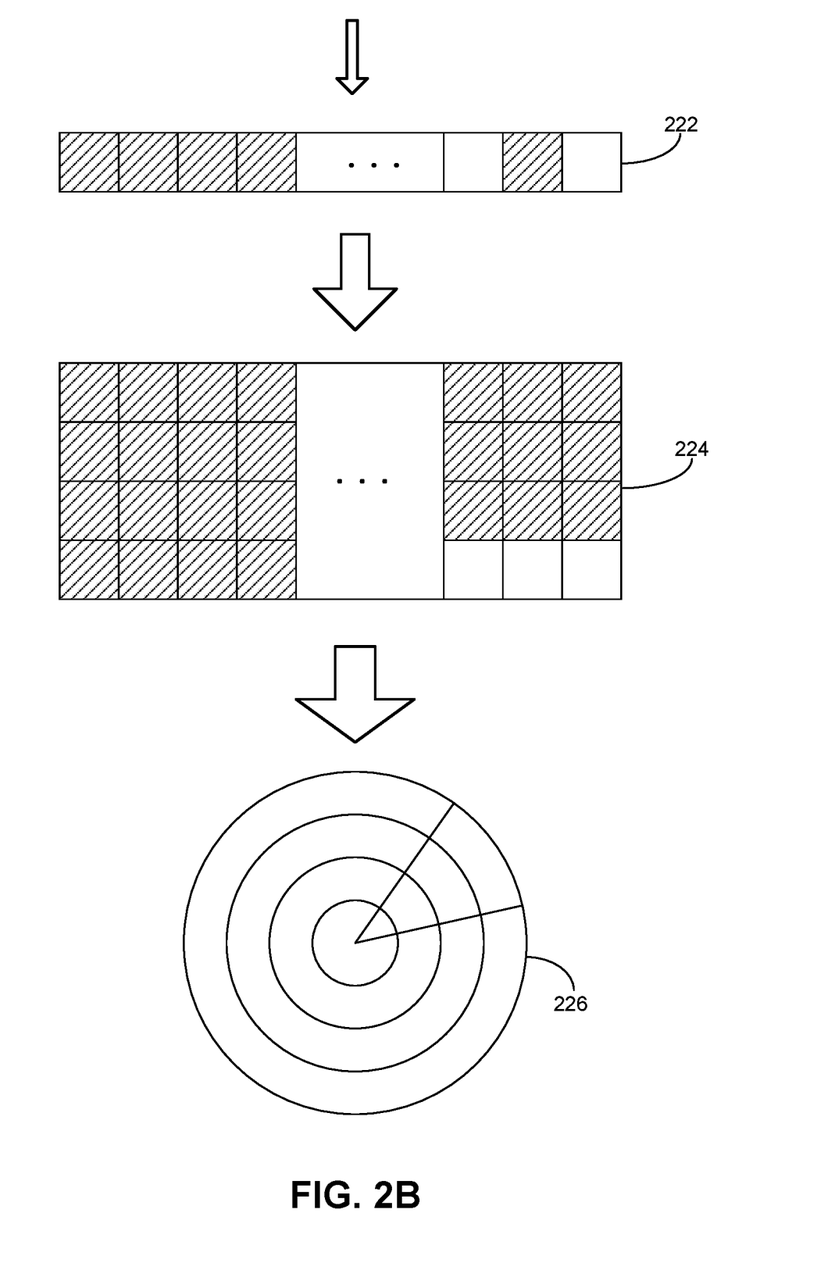
FIG. 2B shows the aggregation of small random writes at the different write-cache layers, in accordance with an embodiment of the present invention.

FIG. 2B shows the aggregation of small random writes at the different write-cache layers, in accordance with an embodiment of the present invention. In the example shown in FIG. 2B, the byte-level write cache can start with empty pages, such as a page 222. As small random writes, each less than a page, arrive at the byte-level write cache, portions of page 222 can be written or updated. More specifically, the writes can be performed in place, meaning that, when one or more bytes within in page 222 needs to be updated, the controller of the write cache can overwrite the existing locations of the bytes within page 222. There is no longer a need for reading and copying content of page 222 to a new page. As page 222 becomes almost full, or updates to block 224 become less frequent, data within page 222 can be flushed down to page-level write cache, which organizes storage cells in blocks, such as a block 224. When block 224 becomes full or updates to block 224 become less frequent, data within block 224 may be flushed down to the second storage, such as HDD 226.

Figure 3:
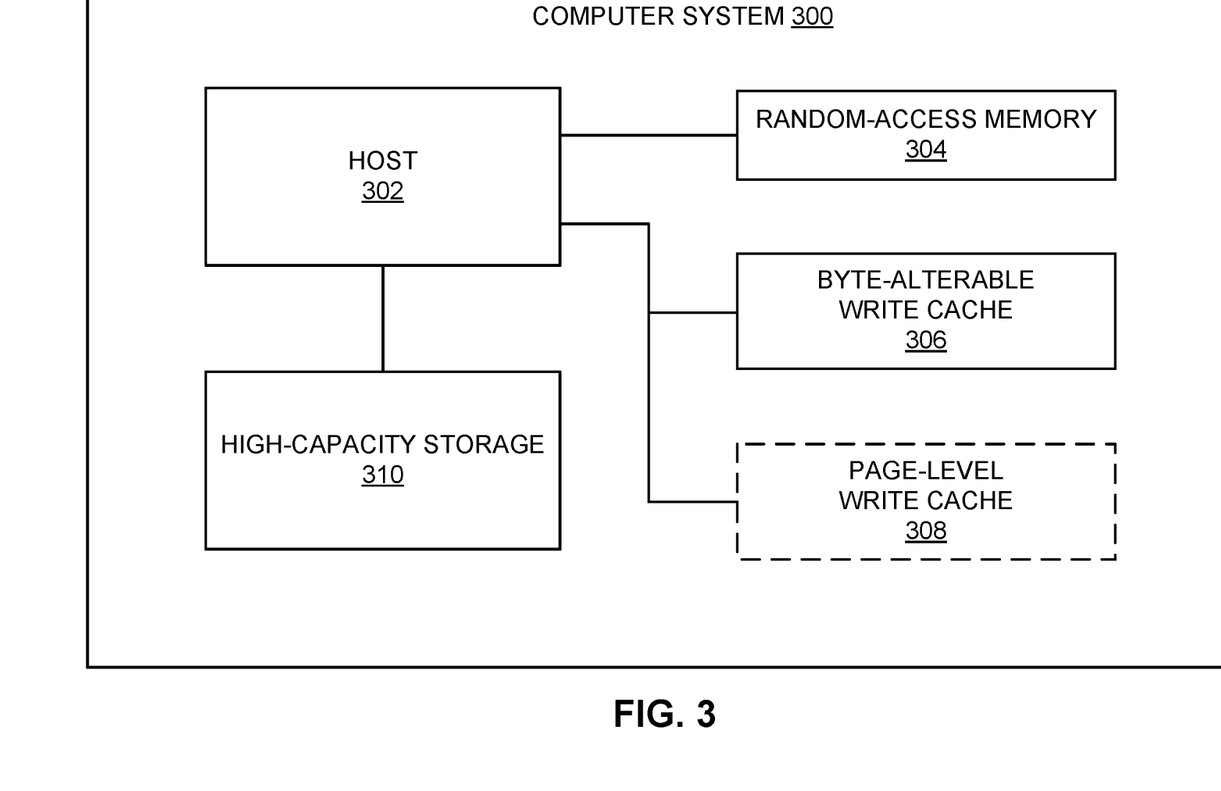
FIG. 3 presents a diagram illustrating an exemplary computer system implementing the byte-alterable write cache, in accordance with an embodiment of the present invention.

FIG. 3 presents a diagram illustrating an exemplary computer system implementing the byte-alterable write cache, in accordance with an embodiment of the present invention. In FIG. 3, computer system 300 includes a host 302, a random-access memory (RAM) 304, a byte-alterable write cache 306, an optional page-level write cache 308, and a high-capacity storage device 310.

RAM 304 can include various types of RAM devices, such as DRAMs. Host 302 can directly access, including performing both read and write operations, RAM 304. In some embodiments, RAM 304 can include one or more synchronous DRAM (SDRAM) devices coupled to host 302 via a double data rate (DDR) interface. Other types of interface may also be possible for interfacing between host 302 and RAM 304, such as low-power DDR (LPDDR) and extreme data rate (XDR) DRAM.

Byte-alterable write cache 306 can include one or more SCM devices that are byte-addressable. An exemplary SCM device can be based on the 3D XPoint™ (trademark of Intel Corporation of Santa Clara, Calif.) technology, which achieves bit storage based on a change of bulk resistance, in conjunction with a stackable cross-gridded data access array. The byte-addressable nature of the SCM device makes it possible for random small writes to make changes in write cache 306 at the byte level. In other words, content within write cache 306 can be updated one byte at a time; there is no longer a need to replace an entire page just to update a byte in the page. Moreover, write operations to write cache 306 can be performed in place, meaning that the when one or more bytes within write cache 306 need to be updated, the controller of write cache 306 can overwrite existing locations of the bytes. There is no longer a need for replacing an entire page just to update a few bytes, as the case of SSDs. This can provide higher efficiency and better performance of the entire storage system. In some embodiments, byte-alterable write cache 306 can be coupled to host 302 via a Peripheral Component Interconnect Express (PCIe) interface.

Optional page-level write cache 308 can include one or more conventional SSD devices, such as NAND flash drives, that are coupled to host 302 via a PCIe interface. Most small random writes that include partial-page updates can be absorbed by byte-alterable write cache 306. In some embodiments, a plurality of partial-page updates can be consolidated at byte-alterable write cache 306 to become page-level updates sent to page-level cache 308. More specifically, various caching algorithms can be used to determine when and how page-level write cache 308 should be refreshed based on the partial-page updates received by byte-alterable write cache 306. The consolidated page-level writes arriving at page-level write cache 308 can be much lower in frequency and less random than the small random writes arriving at byte-alterable write cache 306.

Large-capacity storage 310 can include low-cost HDDs or SSDs, and can be coupled to host 302 via a serial AT Attachment (SATA) interface. Due to the slow speed of high-capacity storage 310, small random writes can first be cached in byte-alterable write cache 306 and optional page-level write cache 308 before they are sent to high-capacity storage 310. Data flushed from byte-alterable write cache 306 and optional page-level write cache 308 mostly can be large chunks of sequential data.

The unique characteristics of the SCM devices, including their ability of in-place writing, high endurance, and low latency, have made SCM devices good candidates for the byte-alterable write cache. However, although SCM devices can support partial-page updates with a granularity at the byte level, most existing storage interfaces are designed for block-storage devices, where data are read and written a whole block at a time, and cannot provide such a high level of granularity. As discussed previously, SDDs and HDD are typical block-storage devices. Various standard interfaces have been developed for coupling between a block-storage device and its host, including but not limited to: a Non-Volatile Memory express (NVMe) interface and a SATA interface. These standard block-storage interfaces generally do not have a granularity of a single byte. For example, a typical NVMe interfaces can have a granularity of 512 bytes and the granularity of a typical SATA interface can be 4096 bytes. In some embodiments, an SCM-based write cache can be coupled to the host via a standard block-storage interface, such as an NVMe interface. Consequently, the write granularity of the storage system can be limited by the standard block-storage interface.

Although it is possible to design and implement a special interface suitable for the byte-level write cache, such an approach can be costly because it requires making changes to existing protocols. In some embodiments, high frequency small writes that resulted in partial-page updates can be sent to the byte-level cache via a standard block-storage interface, such as the NVMe interface, for block storage devices.

When communicating with the byte-level write cache over a standard block-storage interface, it is possible for the host to use write commands that are specific to the byte-level write cache to achieve partial-page updates. However, considering that the host may use the same type of interface to access the page-level write cache, which can be a block-storage device (e.g., an SSD device), having the host generate different types of commands for the same type of interface can be cumbersome. To simplify the operation of the host and to make the solution of the byte-level write cache compatible with other legacy equipment (including conventional hosting systems with standard storage interfaces), in some embodiments, operations of the hierarchical write cache, more particularly the byte-level write cache, are transparent to the host. In other words, the host is not aware of the hierarchical structure of the write cache and can continue to issue regular write commands over the standard storage interface (e.g., the NVMe interface). Instead, specially designed processing control units located on the byte-level write cache (e.g., an SCM device) can process received write commands and apply page masks when needed. The page masks allow the media controller of the SCM device to selectively write portions of pages that need to be updated.

Figure 4:
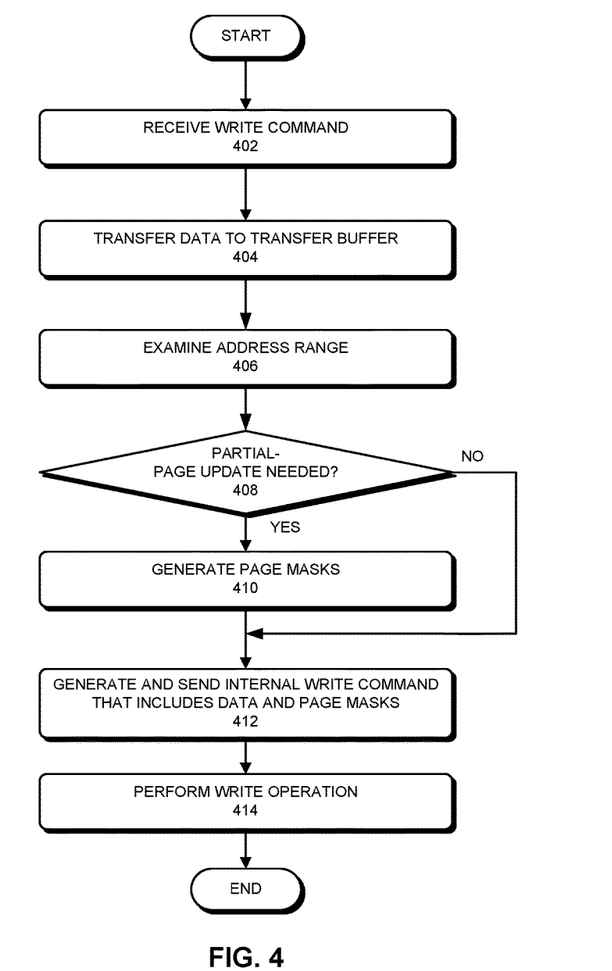
FIG. 4 presents a flowchart illustrating an exemplary write operation of a byte-level write cache, in accordance with an embodiment of the present invention.

FIG. 4 presents a flowchart illustrating an exemplary write operation of a byte-level write cache, in accordance with an embodiment of the present invention. During operation, the byte-level write cache receives a write command from the host (operation 402). The write command can include the location (e.g., the address range) to write to and the to-be-written data. The address can be the logical block address (LBA). The to-be-written data can be transferred (e.g., by the direct memory access (DMA) controller) to a transfer buffer (operation 404). In the meantime, a command pre-processing unit located on the byte-level write cache can examine the address range of the received write command (operation 406), and determines whether a partial-page update is needed (operation 408). Because the pre-processing of the command and the transfer of the to-be-written data to the transfer buffer can happen simultaneously, no additional latency will be needed compared with the system without the byte-level write cache. On the other hand, the low latency of the SCM devices (which can be magnitudes lower than that of the SSD devices) ensures that the latency for write operations in embodiments of the present invention can be much lower than conventional storage systems.

In some embodiment, the command pre-processing unit checks the page alignment condition and length of the write. If the address range is not page-aligned or the write length is less than a page, the command pre-processing unit can determine that a partial-page update is needed. For example, the write may start at the beginning of a 4 KB page and end at the middle of a next page, meaning that the next page will need to be partially updated. In another example, the write may start at the middle of a page and end at the middle of the next page, meaning that both pages need to be partially updated. On the other hand, if the address range is aligned to the beginning and ending of one or more pages, there is no need for the partial-page update.

In response to determining that a partial-page update is needed, the command pre-processing unit can generate one or more page masks based on the alignment between the address range and the pages (operation 410). More specifically, one page mask can be generated for each to-be-partially-updated page. The page mask can be used to prevent writing to portions of the page that are not intended to be updated. In other words, the page mask only allows writing to the unmasked portion of a page. No page mask is generated if there is no need for a partial-page update. An internal write command that includes the page masks and data stored in the transfer buffer can then be generated and sent to the media controller of the write cache (operation 412). The media controller can perform the write operation on the storage medium accordingly (operation 414). More specifically, media controller performs in-place writing at the unmasked portion of the page, without the need to copy the content of the page to a new place.

Figure 5:
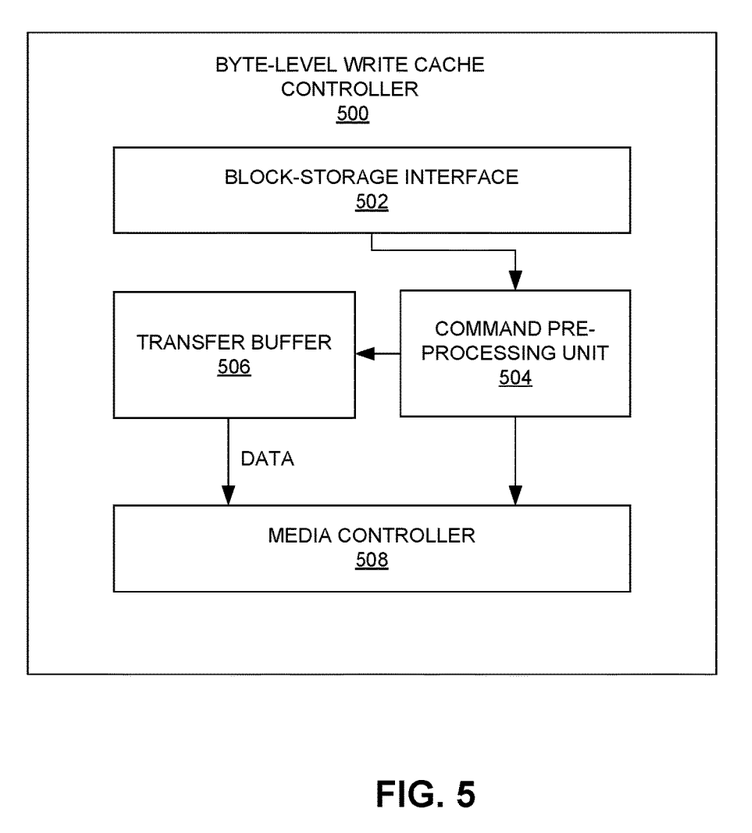
FIG. 5 presents a diagram illustrating an exemplary controller of a byte-level write cache, in accordance with an embodiment of the present invention.

FIG. 5 presents a diagram illustrating an exemplary controller of a byte-level write cache, in accordance with an embodiment of the present invention. Byte-level write cache controller 500 can include a block-storage interface 502, a command pre-processing unit 504, a transfer buffer 506, and a media controller 508. In some embodiments, the byte-level write cache can include an SCM device, and byte-level write cache controller 500 can include an SCM controller.

Block-storage interface 502 can be a standard communication interface between a block storage device (e.g., a flash drive) and a host. In some embodiments, block-storage interface 502 can include a standard block-storage interface, such as an NVMe interface or a SATA interface. During operation, controller 500 can receive, via block-storage interface 502, from the host write commands. The write commands can be standard write commands issued by the host to any storage device, and can include the address range and the to-be-written data. The host is not aware of the existence of the byte-level write cache.

Block-storage interface 502 can forward the write command to command pre-processing unit 504, which is responsible for processing the command. Command pre-processing unit 504 can forward the to-be-written data to a transfer buffer. Command pre-processing unit 504 can also examine the address range of the write command to determine if such a write operation requires a partial-page update. For example, command pre-processing unit 504 can check the beginning and ending LBAs to determine whether the write will be page-aligned, i.e., whether the beginning and ending LBAs are aligned to the beginning and ending, respectively, of a page. Alternatively, command pre-processing unit 504 can check the beginning LBA of the write and the length of the data to determine whether the write is page-aligned. If a partial-page update is needed (e.g., the beginning or ending LBA included in the write command is not page-aligned or the data length is less than a page), command pre-processing unit 504 computes a page mask for each page that needs to be partially updated. For example, if the beginning and ending LBAs are within the same page, only one page mask will be computed. On the other hand, if the data is more than one page long and the beginning and ending LBAs are in the middle of different pages, two page masks will be computed, one for the beginning page and one for the ending page.

Figure 6:
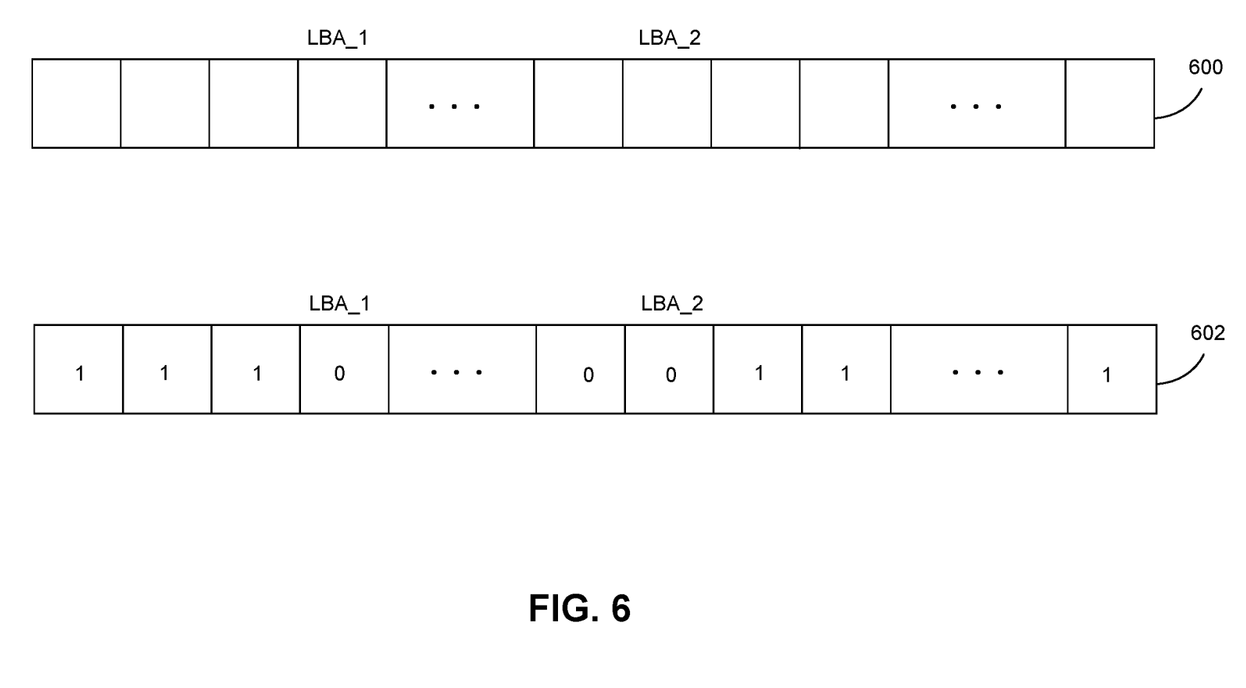
FIG. 6 presents a diagram illustrating the concept of a page mask, in accordance with an embodiment of the present invention.

FIG. 6 presents a diagram illustrating the concept of a page mask, in accordance with an embodiment of the present invention. In FIG. 6, a page 600 can includes a number of cells, each cell capable of carrying a data bit. In some embodiments, a page of the byte-level write cache can have a standard size, such as 2, 4, or 8 KB. In the example shown in FIG. 6, all cells in page 600 have been written with data. A received write command may have the effect of replacing the content of some of the written cells. For example, a write command can replace a certain number of bytes of data included in page 600. If the interface has a granularity of 512 bytes, the write command will accordingly have a granularity of 512 bytes. The beginning LBA of the write command is LBA_1, and the ending LBA of the write command is LBA_2. A page mask 602 can be generated based on the beginning and ending LBAs of the write command. More specifically, the bit positions of page mask 602 outside the write range LBA_1-LBA_2 can be assigned a value of "1," whereas bits of page mask 602 positioned within range LBA_1-LBA_2 can be assigned a value of "0," as shown in FIG. 6. Depending on the implementation, the page mask may have different polarities. For example, it is also possible for page mask 602 to have "0s" for bits positioned outside of the write range LBA_1-LBA_2 and "1s" for bits within range LBA_1-LBA_2.

Note that certain SCM media may be capable of updating value of each single memory cell. However, doing so will require a large tracking overhead for tracking data at bit level. Moreover, updating one bit at a time can be less efficient. On the other hand, by applying the page mask (e.g., by maintaining the voltage level at certain bit lines regardless of incoming data), one can achieve writes at bit or byte level with the speed of page-level writes.

Returning to FIG. 5, after computing the page masks, command pre-processing unit 504 can send the data stored in transfer buffer 506 along with the page masks to media controller 508. While writing into a particular page in the underlying storage medium, media controller 508 can apply the page mask, if any, to selectively write to portions of the page. Using FIG. 6 as an example, because of page mask 602 only the portion of page 600 between LBA_1 and LBA_2 can be updated by the write command, whereas other portions of page 600 remain unchanged. This prevents any write amplification, because the amount of data written to the storage media equals the amount of data written by the host. In the example shown in FIG. 5, byte-level write cache controller 500 issues write commands on the basis of pages, in a way similar to an SSD controller, thus allowing efficient high-speed writing of full pages, whereas the application of the page masks enables flexible partial-page updates.

The byte-level write cache can provide an additional layer in the storage hierarchy, improving the efficiency and performance of the entire storage system, especially in an environment having high-frequency random small writes. This is particularly important for cloud storage services, where cloud service providers maintain physical storage equipment and lease or sell storage capacity to clients. The cloud storage providers are also responsible for keeping the data available and accessible at all time. Depending on the applications, clients may issue high-frequency random writes while accessing their data. To be able to provide high performance storage service, it is desirable for cloud service providers to implement the byte-level write cache as part of their storage hierarchy. Moreover, the low latency of the byte-level write cache also makes them particularly useful for latency-sensitive metadata applications, such as financial service applications, intelligence applications, and other applications with latency thresholds.

In general, embodiments of the present invention can provide a novel byte-level write cache that can improve the efficiency and performance of a storage system. The byte-level write cache can be implemented using SCM devices. To provide compatibility to existing systems, the byte-level write cache can interface with the host using a standard storage interface. To ensure write efficiency, the controller of the byte-level write cache can generate page masks to facilitate partial-page updates. This scheme can solve the write amplification problem facing conventional SSD devices because of the in-place writing capability of SCM devices. In addition to the exemplary architecture shown in FIGS. 2 and 3 where the byte-level write cache is located between the primary storage and the secondary storage, it is also possible for the byte-level write cache to be part of the primary storage that is directly accessible by the host. Alternatively, the byte-level write cache can also be part of the host. For example, in addition to a processor cache, a CPU can also have a built-in write cache based on SCM in order to efficiently handle high-frequency small random writes.

Figure 7:
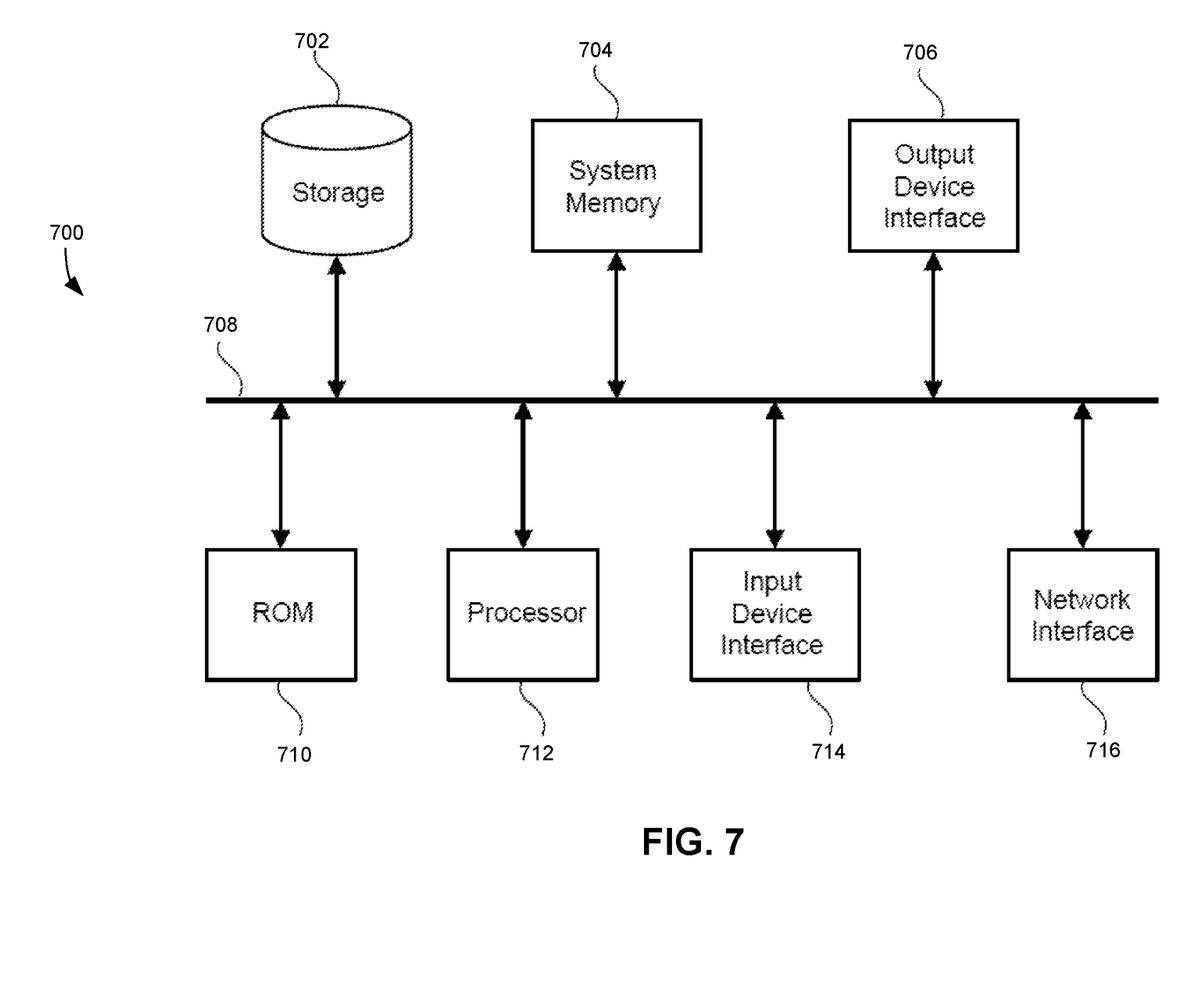
FIG. 7 conceptually illustrates an electronic system with which some implementations of the subject technology are implemented.

FIG. 7 conceptually illustrates an electronic system with which some implementations of the subject technology are implemented. Electronic system 700 can be a client, a server, a computer, a smartphone, a PDA, a laptop, or a tablet computer with one or more processors embedded therein or coupled thereto, or any other sort of electronic device. Such an electronic system includes various types of computer-readable media and interfaces for various other types of computer-readable media. Electronic system 700 includes a bus 708, processing unit(s) 712, a system memory 704, a read-only memory (ROM) 710, a permanent storage device 702, an input device interface 714, an output device interface 706, and a network interface 716.

Bus 708 collectively represents all system, peripheral, and chipset buses that communicatively connect the numerous internal devices of electronic system 700. For instance, bus 708 communicatively connects processing unit(s) 712 with ROM 710, system memory 704, and permanent storage device 702.

From these various memory units, processing unit(s) 712 retrieves instructions to execute and data to process in order to execute the processes of the subject disclosure. The processing unit(s) can be a single processor or a multi-core processor in different implementations.

ROM 710 stores static data and instructions that are needed by processing unit(s) 712 and other modules of the electronic system. Permanent storage device 702, on the other hand, is a read-and-write memory device. This device is a non-volatile memory unit that stores instructions and data even when electronic system 700 is off. Some implementations of the subject disclosure use a mass-storage device (such as a magnetic or optical disk and its corresponding disk drive) as permanent storage device 702.

Other implementations use a removable storage device (such as a floppy disk, flash drive, and its corresponding disk drive) as permanent storage device 702. Like permanent storage device 702, system memory 704 is a read-and-write memory device. However, unlike storage device 702, system memory 704 is a volatile read-and-write memory, such as a random access memory. System memory 704 stores some of the instructions and data that the processor needs at runtime. In some implementations, the processes of the subject disclosure are stored in system memory 704, permanent storage device 702, and/or ROM 710. From these various memory units, processing unit(s) 712 retrieves instructions to execute and data to process in order to execute the processes of some implementations.

Bus 708 also connects to input and output device interfaces 714 and 706. Input device interface 714 enables the user to communicate information and send commands to the electronic system. Input devices used with input device interface 714 include, for example, alphanumeric keyboards and pointing devices (also called "cursor control devices"). Output device interface 706 enables, for example, the display of images generated by the electronic system 700. Output devices used with output device interface 706 include, for example, printers and display devices, such as cathode ray tubes (CRT) or liquid crystal displays (LCD). Some implementations include devices such as a touchscreen that function as both input and output devices.

Finally, as shown in FIG. 7, bus 708 also couples electronic system 700 to a network (not shown) through a network interface 716. In this manner, the computer can be a part of a network of computers (such as a local area network ("LAN"), a wide area network ("WAN"), or an intranet, or a network of networks, such as the internet. Any or all components of electronic system 700 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A data storage system, the system comprising:
   a communication interface configured to receive a write command from a host of the data storage system, wherein the write command comprises to-be-written data and associated address information;
   a random-access memory (RAM)-based storage device coupled to the communication interface;
   a first write cache coupled to the RAM-based storage device, wherein the first write cache comprises a persistent storage class memory (SCM) device; and
   a high-capacity storage device coupled to the first write cache, wherein the first write cache is configured to receive the to-be-written data from the RAM-based storage device and temporarily store the to-be-written data before sending the to-be-written data to the high-capacity storage device, and wherein the first write cache is configured to update its content by performing byte-level in-place writing based on the received write command.

2. The data storage system of claim 1, wherein the high-capacity storage device comprises one or more of:
   a hard disk drive (HDD); and
   a solid-state drive (SSD).

3. The data storage system of claim 1, wherein the communication interface comprises a standard block-storage interface.

4. The data storage system of claim 3, wherein the standard block-storage interface comprises a Non-Volatile Memory express (NVMe) interface.

5. The data storage system of claim 1, further comprising a second write cache coupled to the first write cache, wherein the second write cache is configured to receive data flushed from the first write cache, and wherein the second write cache is configured to update its content at page level based on data received from the first write cache.

6. The data storage system of claim 5, wherein the second write cache comprises a solid-state drive (SSD).

7. The data storage system of claim 6, wherein the SSD includes a NAND flash memory.

8. The data storage system of claim 1, wherein the first write cache comprises a command-processing unit configured to:
   process the write command to determine whether updating its content requires a partial-page update;
   in response to determining that a partial-page update is required, compute at least one page mask, wherein the page mask indicates portions of a page that need to be updated; and
   send the page mask to a media controller to facilitate content updating at the indicated portions of the page.

9. The data storage system of claim 8, wherein while processing the write command, the command-processing unit is further configured to simultaneously transfer the to-be-written data to a transfer buffer.

10. A computer-implemented method for caching small random writes issued from a host to a storage system coupled to the host, the method comprising:
    receiving a write command from the host, wherein the write command comprises to-be-written data and address information associated with the to-be-written data;
    sending the to-be-written data to a first write cache via a random-access memory (RAM)-based storage device coupled to the communication interface;
    temporarily storing the to-be-written data at the first write cache before sending the to-be-written data to a high-capacity storage device coupled to the first write cache, wherein the first write cache comprises a persistent storage class memory (SCM) device, and wherein storing the to-be-written data involves performing byte-level in-place writing based on the received write command.

11. The computer-implemented method of claim 10, wherein the high-capacity storage device comprises one or more of:
    a hard disk drive (HDD); and
    a solid-state drive (SSD).

12. The computer-implemented method of claim 10, wherein the communication interface comprises a standard block-storage interface.

13. The computer-implemented method of claim 12, wherein the standard block-storage interface comprises a Non-Volatile Memory express (NVMe) interface.

14. The computer-implemented method of claim 10, further comprising flushing to-be-written data to a second write cache from the first write cache before sending the to-be-written data to the high-capacity storage device, wherein the second write cache is configured to update its content at page level based on data received from the first write cache.

15. The computer-implemented method of claim 14, wherein the second write cache comprises a solid-state drive (SSD).

16. The computer-implemented method of claim 15, wherein the SSD includes a NAND flash memory.

17. The computer-implemented method of claim 10, wherein updating the content of the first write cache comprises:
    processing the write command to determine whether a partial-page update is required;
    in response to determining that a partial-page update is required, computing at least one page mask, wherein the page mask indicates portions of a page that need to be updated; and
    sending the page mask to a media controller of the first write cache to facilitate content updating at the indicated portions of the page.

18. The computer-implemented method of claim 17, further comprising simultaneously transferring the to-be-written data to a transfer buffer while processing the write command.

* * * * *